(12) United States Patent
Nadas

(10) Patent No.: US 7,835,727 B2
(45) Date of Patent: Nov. 16, 2010

(54) METHOD AND SYSTEM FOR USING USER EQUIPMENT TO COMPOSE AN AD-HOC MOSAIC

(75) Inventor: Stephen Nadas, Raleigh, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 910 days.

(21) Appl. No.: 11/625,643

(22) Filed: Jan. 22, 2007

(65) Prior Publication Data

US 2008/0176514 A1 Jul. 24, 2008

(51) Int. Cl.
*H04M 3/42* (2006.01)
(52) U.S. Cl. ............... 455/414.1; 455/41.2; 455/420
(58) Field of Classification Search ....... 455/41.1–41.3, 455/39, 150.1, 151.1, 151.2, 414.1, 420, 455/507–508, 68, 88, 151.4; 396/56–59, 396/322, 325, 333
See application file for complete search history.

(56) References Cited

U.S. PATENT DOCUMENTS 6,757,531 B1 * 6/2004 Haaramo et al. ......... 455/414.1

7,657,224 B2 * 2/2010 Goldberg et al. ........... 455/3.06
2004/0203381 A1* 10/2004 Cahn et al. ................ 455/41.2

FOREIGN PATENT DOCUMENTS

| EP | 1478134 A | 11/2004 |
|----|-----------|---------|
| EP | 1478134 A1 * | 11/2004 |
| JP | EP 1478134 A1 * | 11/2004 |

OTHER PUBLICATIONS

"CIMERC Phase 1 Final Report"; Jan. 7, 2003, pp. 1-12; XP002486217 Retrieved from internet: URL: http://prism2.mem.drexel.edu/lpaul/> retrieved on Jun. 26, 2008.

* cited by examiner

*Primary Examiner*—Kent Chang
*Assistant Examiner*—Sarwat Chughtai

(57) ABSTRACT

An application that runs on a User Equipment (UE) in one of three main modes: (1) listener, (2) proxy, or (3) controller, and defaults to listener mode. A UE is placed by a user into controller mode, which causes the application to scan the area covered by its Bluetooth radio and identify other Bluetooth enabled devices. For all the Bluetooth devices found, the controller attempts to contact the UEs in listener mode to form a group of interested listeners. The UE in controller mode then sends a message to all group members. The message alerts the user of each UE in listening mode to prepare to take a photograph or video. The UE in listener mode provides the users with audio and visual cues and after a time period each UE in the group takes a photograph or a video.

18 Claims, 3 Drawing Sheets

US 7,835,727 B2

METHOD AND SYSTEM FOR USING USER EQUIPMENT TO COMPOSE AN AD-HOC MOSAIC

BACKGROUND

Modern user equipment (UE) including mobile devices, terminals and telephones provide voice (telephony) services and data services. The data services provide the ability to access the Internet and to send information to and from the UE. Transducer components, such as a microphone, speaker, video and/or still camera, are included within a typical UE. Other transducers can also be coupled to the UE. Thus, the data service can be used to send to others and receive, among other things, images that have been captured by the UE. Many UE also include Bluetooth technology or other short range wireless functionality which provides the ability to wirelessly transfer information between the UE and other nearby Bluetooth enabled devices, for example, laptops or other Bluetooth enabled UE. When used herein, reference to Bluetooth also shall be deemed to refer to other short range wireless technology and reference to an ad-hoc mosaic shall be deemed to refer to a set of information taken from a set of UE transducers or UE sensors, for example, a set of photographs and/or videos.

SUMMARY

An embodiment of the present invention takes advantage of on-board transducers present in modern UE, in particular, video and/or still camera functionality of the UE and Bluetooth technology. Specifically, said embodiment of the present invention comprises an application loaded on a UE which has a camera and Bluetooth functionality. The application runs in one of three main modes: (1) listener, (2) proxy, or (3) controller mode. The application defaults to listener mode. The proxy and controller modes are supersets of listener mode, that is, the proxy and controller functions are provided in addition to listener mode functions. The application preferably is implemented using software adapted to be loaded onto and executed by the UE. Thus, using the application, the UE is adapted to be placed by a user into controller mode, which causes the application to multicast an invitation message that scans the area covered by its Bluetooth radio and notifies other Bluetooth enabled devices, which can reply to the controller. For all the Bluetooth devices that reply, the controller attempts to contact the listener applications to form a group of interested listeners. The controller then sends a message to all such group members. The message alerts each user to prepare to take a photograph or video. The listener application provides the users with audio and/or visual cues and after a certain time period, each UE group member takes a photograph or video.

An alternative embodiment of the present invention triggers the information capture by the UE transducers and/or sensors via a message from the controller. The result is a set of photographs and/or videos, that is, an ad-hoc mosaic, taken at the same time in a related place but with differing points of view. Once the photographs and/or videos are taken, each listener application causes its respective UE to send, via the UE data service or Bluetooth functionality, its photograph and/or video to the UE in controller mode or to some repository that the UE in controller mode has previously configured.

DETAILED DESCRIPTION

An embodiment of the present invention comprises an application adapted to run on a UE equipped with a video and/or still camera and Bluetooth wireless module. This application is further adapted to run in one of three primary modes: (1) listener, (2) proxy, or (3) controller, and is adapted to default to listener mode. The application preferably is implemented using software adapted to be loaded onto and executed by the UE. The application is configured with information describing common application group and when the application is started, the UE joins this group and listens for messages from that group.

Figure 1:
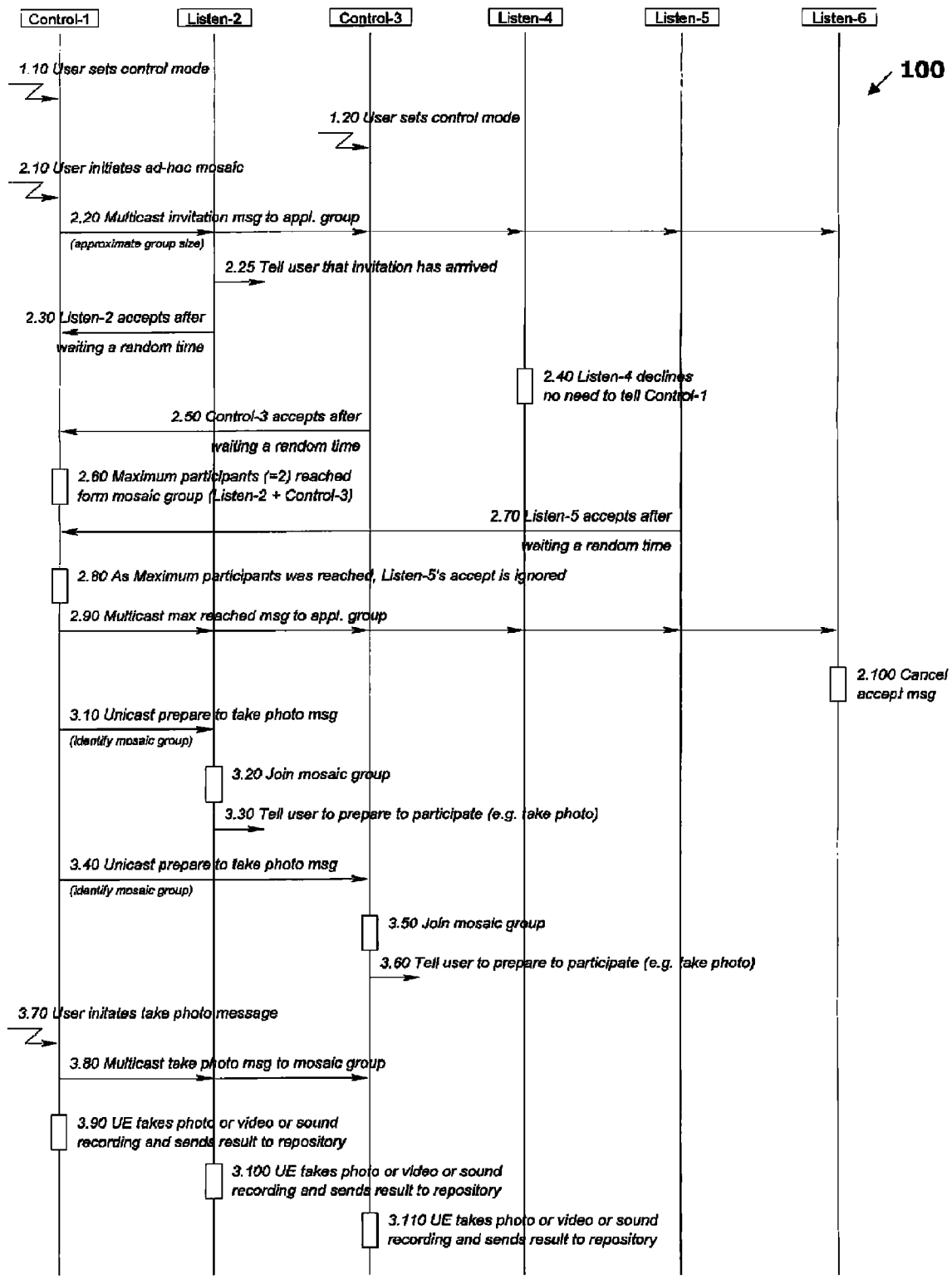
FIG. 1 is a first event sequence flow chart of the method of the present invention.

FIG. 1 is an event sequence flow chart 100 of the method of the present invention. The flow chart 100 illustrates the set up, performance and creation of an ad-hoc mosaic. As seen therein, time flows downward. More specifically, flow chart 100 depicts six UE: Control-1, Listen-2, Control-3, Listen-4, Listen-5, and Listen-6. Each of these has started the application component of the present invention, joined and are listening on the common application's multicast group. In steps 1.10 and 1.20, each of the users of Control-1 and Control-3 has placed their application into controller mode. In step 2.10, the user of Control-1 initiates an ad-hoc mosaic using the application's controller mode user interface. Step 2.10 includes configuring the application for a maximum number of participants. In this example, the application is configured for a maximum number of two (2) participants. In step 2.20, the application, in controller mode, sends out an invitation message to the participant group. In step 2.25, the application informs each user that a new invitation to participate in an ad-hoc mosaic has arrived and the user decides whether to participate. Note that step 2.25 occurs for all listening nodes, in particular, for Control-3, Listen-4, Listen-5, and Listen-6 (these nodes not shown in FIG. 1 for the sake of brevity). In step 2.30 the application of Listen-2 sends a message to the application of Control-1 to indicate willingness to participate. In step 2.40, the user of Listen-4 decides not to participate—note that no message to the application of Control-1 is required. In step 2.50 the application of Control-3 sends a message to the application of Control-1 to indicate willingness to participate. Note that this embodiment envisions controller mode and proxy mode as supersets of listener mode. In step 2.60, the application of Control-1 notes it has received the maximum number of accept messages that were configured, and so, in step 2.90, it sends a message to the group to indicate that a full subscription for the ad-hoc mosaic has been reached. In step 2.70, which is after step 2.60 but before step 2.90, the application of Listen-5 sends an accept message. In step 2.80, the accept message is discarded by the application of Control-1 because the maximum number of accepts have already been received. In step 2.100, the application of Listen-6 receives the full subscription message in time to cancel its own accept message. In step 3.10 the application of Control-1 sends a join mosaic message notifying the application of Listen-2 to join a second multicast group for the ad-hoc mosaic. In step 3.20, the application of Listen-2 joins the second multicast group and in step 3.30, prompts the user of Listen-2 to prepare to take the ad-hoc mosaic. In step 3.40, the application of Control-1 sends a join mosaic message telling the application of Control-3 to join a second multicast group for the ad-hoc mosaic. In step 3.50, the application of Control-3 joins the second multicast group and in step 3.60, prompts the user of Control-3 to prepare to take the ad-hoc mosaic. In step 3.70, the user of Control-1 initiates the ad-hoc mosaic and this action results in step 3.80, a message being sent to the second multicast group. In step 3.90, the application of Control-1 takes its contribution to the ad-hoc mosaic and sends it to the indicated repository. In step 3.100, the application of Listen-2 takes its contribution to the ad-hoc mosaic and sends it to the indicated repository. In step 3.110, the application of Control-3 takes its contribution to the ad-hoc mosaic and sends it to the indicated repository.

Figure 2:
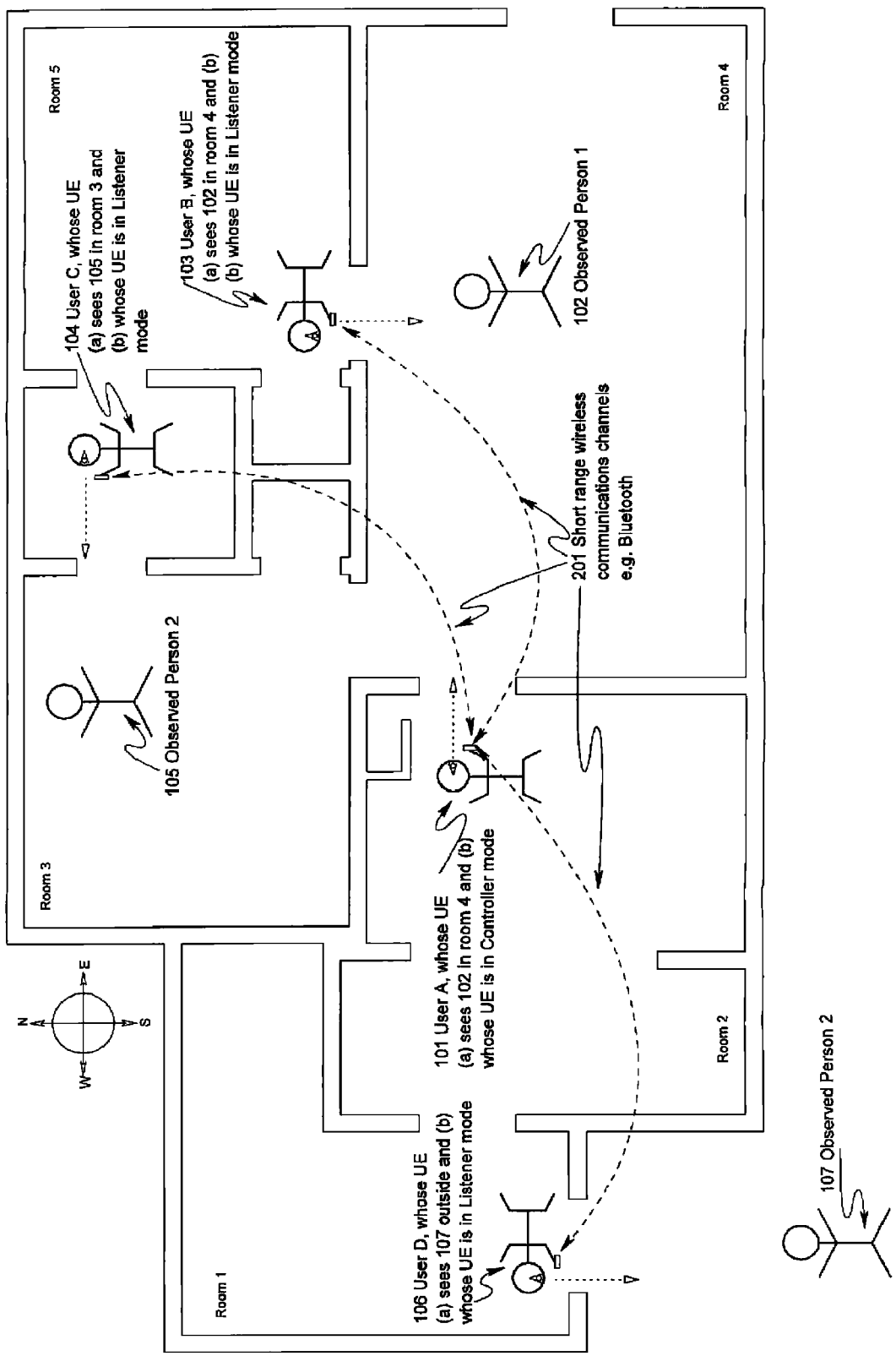
FIG. 2 is an illustration of a system adapted to perform the method of the present invention.

Now referring to FIG. 2, the present invention is illustrated in operation, for example, in a schematic diagram of the floor plan 200 of a house. As seen therein, user 101 has a UE in controller mode, said UE facing east and observing a first person 102. User 103 is another user of the system whose UE is in listener mode, and whose UE is facing south and also observing first person 102, but from a different vantage point. User 104 is another user of the system whose UE is in listener mode, and whose UE is facing west and is observing second person 105. User 106 is another user of the system whose UE is in listener mode, and whose UE is facing south and is observing third person 107. A digital still photograph ad-hoc mosaic taken at this point would consist of first person 102 being observed from both the west and north and third person 107 being observed from the north.

Figure 3:
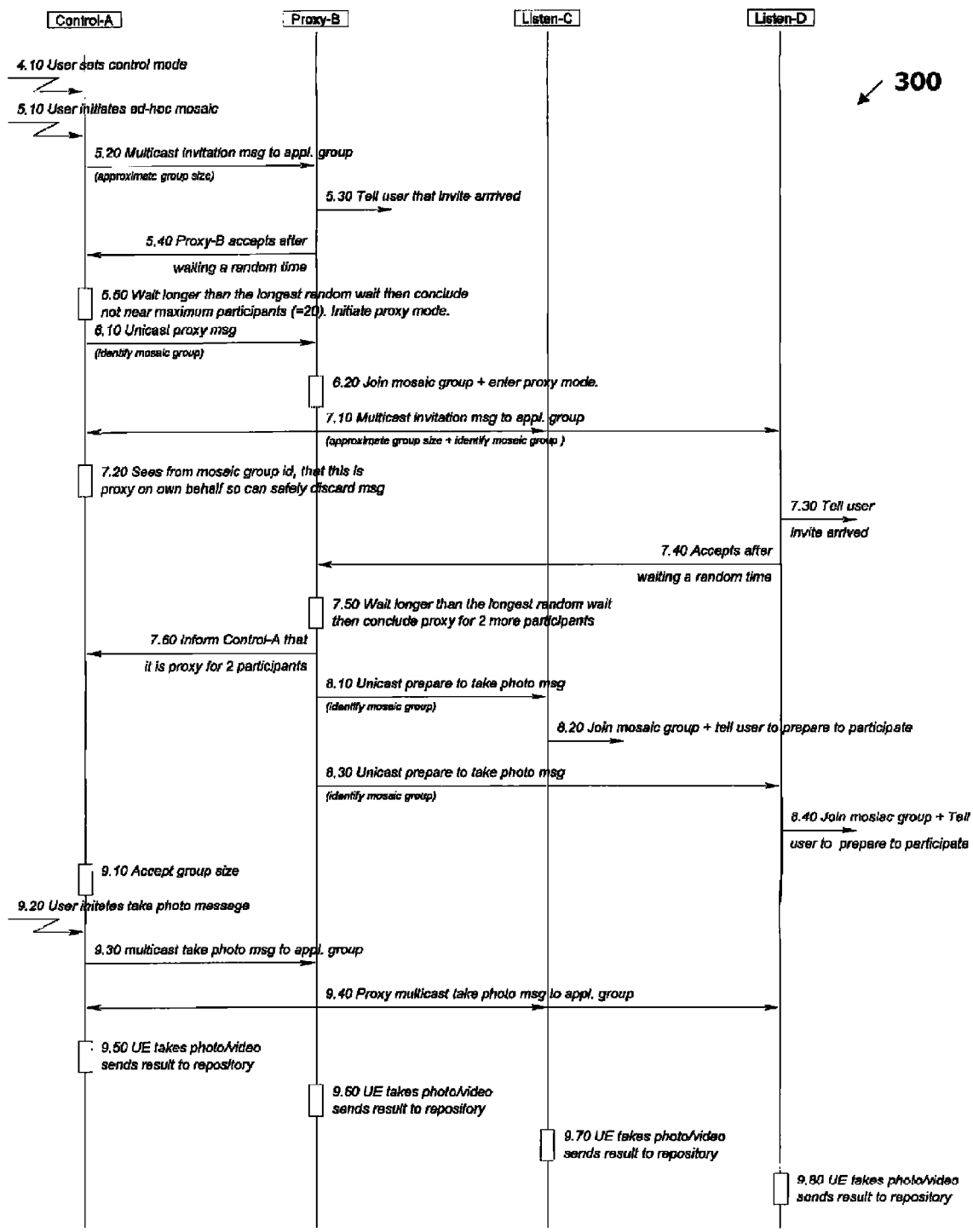
FIG. 3 is a second event sequence flow chart of the method of the present invention

FIG. 3 is another event sequence flow chart 300 of the method of the present invention. The flow chart 300 illustrates the proxy set up, performance and creation of an ad-hoc mosaic. As seen therein, time flows downward. FIG. 3 depicts four UE: Control-A, Proxy-B, Listen-C, and Listen-D. Each of these UE has started the application of the present invention and has joined and is listening on the common application's multicast group. As seen therein, in step 4.10 the user of Control-A UE places its application into controller mode. In step 5.10, the user of Control-A UE initiates an ad-hoc mosaic which results in the application sending a multicast message to the application group to invite participants. In the example of FIG. 3, Proxy-B receives this message. Note that UE Listen-C and Listen-D are not in range of Control A, so they do not receive the invitation message. In step 5.30, the application informs its user that an invitation has arrived. The user agrees to participate, and in step 5.40, the application of Proxy-B sends an acceptance message after delaying for a short, random amount of time to avoid overloading Control-A. In step 5.50, the application of Control-A waits longer than the short, random time of any of the other UE and concludes that only one application has agreed to participate. In this example, the number of participants is one (1), whereas the application was configured for twenty (20). Thus, the application of Control-A initiates proxy mode in step 6.10 by sending a unicast message to Proxy-B to initial proxy mode. The unicast message includes an identifier of the mosaic multicast group. In step 6.20, Proxy-B joins the mosaic multicast group and enters proxy mode. In step 7.10, the application of Proxy-B sends a multicast invitation message to the application group. Control-A, in step 7.20, receives the proxy invitation message, and sees that it is an invitation for a mosaic group of which it is the initiator, hence it can discard the message. Note that Listen-C and Listen-D are in range of Proxy-B, but not in range of Control-A, so they receive the proxy invitation message as well. In step 7.30 the application of Listen-D informs the user that a new invitation to participate in an ad-hoc mosaic has arrived and the user decides to participate. In step 7.40, the application of Listen-D sends a unicast message to Proxy-B accepting, after waiting a short, random amount of time to avoid overwhelming Proxy-B. These same steps occur with respect to Listen-C, such steps not being shown for the sake of brevity. In step 7.50, the application of Proxy-B waits longer than the short, random time of any other UE and concludes that two (2) applications have agreed to participate. In step 7.60, the application of Proxy-B sends a unicast message to Control-A to inform it that it is proxy for two (2) participants. In steps 8.10 and 8.30, Proxy-B sends a "prepare to take photo" message to each of Listen-C and Listen-D. In steps 8.20 and 8.40, Listen-C and Listen-D each join the mosaic group and send user notifications to prepare to participate. In step 9.10, Control-A accepts the group size and in step 9.20, the user of Control-A initiates taking a mosaic. In step 9.30, Control-A sends a multicast "take mosaic" message to the mosaic group. In step 9.40 Proxy-B sends (as proxy) a multicast "take mosaic" message to the mosaic group. In steps 9.50, 9.60, 9.70, and 9.80 Control-A, Proxy-B, Listen-C and Listen-D all take the photo and sends their result to the repository.

Thus, as herein-before described, A photograph/video mosaic is initiated when the application of a UE is placed into controller mode by the user. The controller application sends a multicast message to the common application group which scans the area covered by the corresponding Bluetooth radio of the UE. Thus, the controller through the UE and its corresponding Bluetooth radio, uses the multicast invitation message to attempt to contact the listener applications for each UE within range. The invitation contains information indicating the desired type or types of components of the ad-hoc mosaic. For example, the invitation may indicate that only photographs are desired. The invitation message also carries an indication about the expected size of the group. The found devices that are in listener mode or control mode prompt their respective users whether they desire to participate in the ad-hoc mosaic. Alternatively, such UEs can be configured to automatically accept invitations to participate in the mosaic. When the UE desires to participate, the application uses the expected size of the group to wait a random amount of time (there being longer wait periods for larger groups) and then a message is sent to the controller that issued an invitation. The purpose of the random waiting time is to avoid overwhelming the controller with reply messages, if, for example the application is run in an area having numerous UE that are running the application.

Note that an alternative embodiment uses the invitation message to identify the a second group to join. In this approach, a UE joins the second multicast group. In this situation, the controller application, if it receives too many accept messages, is adapted to send a unicast a messages to some UE to drop out of the group. This alternative embodiment is preferred when either precise control of the number of participants is not needed, and hence, pruning messages can be neglected.

The application, while in controller mode, is configured with a desired maximum group size. The size of the group may be zero if: no UE are identified; no UE running the application are identified; or if all the users cause their UE in listener mode to decline the invitation to join. When the group is not empty, the controller sends a message that carries information identifying a second group, the mosaic group, to each of the group members. When the group members receive this message they each join this group and listen for messages from it.

Assuming there is at least one listener, that is, the controller has received at least one acceptance message, such that the group has at least two members, if desired, the user can cause its UE in controller mode to expand the group by signaling the group members to enter the proxy mode. In proxy mode, the group members also send the invitation, by multicast, to the common application group, as described above, and thus are operable to scan the area covered by the union of all the group member's Bluetooth radios. In this manner, it is possible to find more UE running the application as the invitation will reach UE Bluetooth radios that are out of range of the UE in controller mode but within range of one of the group members. When a UE, acting as a proxy, finds a new UE in listener mode, the UE, acting as proxy, will be configured to relay commands to and from the UE in controller mode to its client UE in listener mode that are reachable through the UE in proxy mode. In this manner, the group can be enlarged multiple times. In a similar way, an expanded group can be reduced, either by limiting the number of intervening UE acting as proxies or by not using particular UE as proxies.

Once the user with the UE in controller mode is satisfied with the size of the group, the UE in controller mode, through its Bluetooth radio, can send a message to all UE comprising the group members, to alert the users to prepare to take a photograph or a video. UE that are in proxy mode are adapted to relay this information to their clients. Each UE in listener mode, which includes each UE in proxy mode, communicates, via the Bluetooth radio, audio and visual cues to alert the users to prepare to participate. At some subsequent point, the controller is directed by its user to initiate the mosaic. The controller application then multicasts a message to the mosaic group. When the mosaic group members receive this message, the listener application activates the UE camera to capture each mosaic group member's component of the ad-hoc mosaic. An alternate approach is for each of the mosaic group members to wait a predetermined time period after which each UE that is a group member activates its camera. Either method results in a near contemporaneous photograph or video. The resulting ad-hoc mosaic is a set of photographs or videos taken at the same time in approximately the same place but with completely different points of view.

Each UE that belongs to the mosaic group then transmits, via the Bluetooth radio or other available mechanism, the resulting photograph or video to the UE in controller mode or to some repository that the UE in controller mode has previously arranged. Conventional editing applications can then be used to combine the set of ad-hoc mosaic to form a final product. The final product typically comprises a "multiple point of view" photograph and/or video, that is, a set of photographs or videos taken by a group of cameras in approximately the same place but with completely different points of view. In this manner a "mosaic picture" or a "mosaic video" of an event is created.

The same method of the present invention can be used in a further embodiment to coordinate a set of Bluetooth enabled cameras and to arrange to control the individual camera orientation or point of view as well. In this manner, the present invention can be used to create a larger camera from a set of smaller cameras by providing a mechanism to control them in tandem. In this further embodiment, the controller application is adapted to dictate, for example, positional cues and exposure controls for the component cameras.

The same method and system of the present invention can be used in yet a further embodiment wherein the application's controller is adapted to control any other common functionality of the UEs in the group, for example, controlling the group members' microphones, speakers or other sensor or transducer.

As will be recognized by those skilled in the art, the innovative concepts described in the present application can be modified and varied over a wide range of applications. For example, the present invention is based on a control approach that can be used to form expandable or reducible groups of Bluetooth enabled devices for whatever purpose. Accordingly, the scope of patented subject matter should not be limited to any of the specific exemplary teachings discussed above, but is instead defined by the following claims.

What is claimed:

1. A method of creating an ad-hoc mosaic comprising the steps of:
    loading an application having at least a controller mode and a listener mode on a plurality of User Equipments (UEs) each having one or more transducers and each having short range wireless functionality, wherein the short range wireless functionality is one selected from the group consisting of infrared, wireless LAN and Bluetooth;
    wherein the transducers of the plurality of UEs is one or more selected from the group consisting of a still camera and video camera;
    setting a first UE into controller mode so as to initiate an ad-hoc mosaic function;
    setting the remainder of the plurality of UEs, referred to as a common application group, into listener mode;
    scanning, by the first UE in controller mode, the general area covered by its short range wireless area;
    contacting, by the first UE in controller mode, the common application group;
    inviting, by the first UE in controller mode, the common application group to form a group of participating listeners;
    sending, by the first UE in controller mode, a multicast message to the common application group, to alert the uses in the common application group to activate one or more of the transducers; and
    combining the resulting set of transducer outputs into a mosaic.

2. The method of claim 1, further comprising:
    providing audio and visual cues to alert each user of the UEs to prepare to activate their respective one or more transducers; and
    after a predetermined time period, taking, by each group member UE, a near contemporaneous one or more transducer output(s).

3. The method of claim 1, wherein the UE in controller mode is adapted to provide the user feedback on the size of the listener group.

4. The method of claim 1, wherein the application further includes a proxy mode.

5. The method of claim 4, further comprising the step of expanding the common application group by signaling the existing common application group members to enter the proxy mode.

6. The method of claim 5, wherein common application group members scan an area so that the area covered by the invitation is the union of all the group members' short range wireless functionality.

7. The method of claim 6, further comprising the step of relaying commands to and from the UE in controller mode to a first set of UEs in listener mode through a second set of UEs in proxy mode.

8. A method of creating an ad hoc mosaic, comprising the steps of:
- providing for a plurality of user equipments (UEs) each having one or more transducers and each having short range wireless functionality, wherein the short range wireless functionality is one selected from the group consisting of infrared, wireless LAN and Bluetooth, and wherein the transducers of the plurality of UEs is one or more selected from the group consisting of a still camera and video camera;
- providing on each UEs a listen mode application and a controller mode application;
- designating a common multicast group comprised of a plurality of UEs whose listen mode application is placed in listen mode;
- placing the controller mode application of at least one of said plurality of UEs in a controller mode;
- initiating, by the at least one UE in controller mode, an ad-hoc mosaic using a controller mode user interface;
- configuring, by the UE in controller mode, the listen mode application for a maximum number of participants;
- sending, by the control mode application of the UE in controller mode, an invitation message to the common multicast group;
- inviting, by the control mode application of the UE in controller mode, each UE of the common multicast group to participate in an ad-hoc mosaic, wherein the ad-hoc mosaic is comprised of data received from a transducer of at least one UE of the common multicast group;
- sending a message, by at least one of the common multicast group to the UE in controller mode, indicating a desire to participate in the ad-hoc mosaic;
- initiating the ad-hoc mosaic by instructing the users of the UEs in the common multicast group to activate at least one of their respective transducers;
- sending, by the at least one of the common multicast group, its contribution to the ad-hoc mosaic comprised of data received from a transducer of at least one UE of the common multicast group, to a specified repository; and
- combining the resulting set of transducer outputs having differing points of view in the specified repository into a mosaic.

9. The method of claim 8, further comprising the step of sending a message to the common multicast group that a full subscription has been reached when the UE in controller mode has received the maximum number of accept messages for which it was configured.

10. The method of claim 9, further comprising the step of discarding, by the application of the UE in controller mode, any accept message received after the maximum number of accepts have been received.

11. The method of claim 8, further comprising the step of instructing, by the UE in controller mode, at least one of the UE in listening mode to join a second multicast group for the ad-hoc mosaic.

12. A system for creating a mosaic comprising:
- a first User Equipment (UE) having an application with a controller mode and a listener mode loaded thereon, the first User Equipment (UE) having a one or more transducers and short range wireless functionality, wherein the short range wireless functionality is one selected from the group consisting of infrared, wireless LAN and Bluetooth, and wherein the transducers of the plurality of UEs is one or more selected from the group consisting of a still camera, video camera, microphone, speaker, sensor and video display;
- at least a second UE having an application with at least a controller mode and a listener mode loaded thereon, the at least second UE having one or more transducers and short range wireless functionality, wherein the short range wireless functionality is one selected from the group consisting of infrared, wireless LAN and Bluetooth, and wherein the transducers of the plurality of UEs is one or more selected from the group consisting of a still camera, video camera, microphone, speaker, sensor and video display;
- means for setting the first UE into controller mode;
- means for setting the at least second UE into listener mode;
- means for scanning, by the first UE in controller mode, the general area covered by its short range wireless area;
- means for contacting, by the first UE in controller mode, the at least second UE in listener mode;
- means for inviting, by the first UE in controller mode, the at least second UE in listener mode to form a group of participating listeners;
- means for sending, by the first UE in controller mode, a message to the at least second UE, to alert a user of the at least second UE to activate one or more of the transducers;
- means for initiating the mosaic by instructing the users of the at least second UEs to activate at least one of their respective transducers;
- means for sending, by the at least second UEs, its contribution to the mosaic comprised of data received from a transducer of at the at least second UE, to a specified repository; and
- means for combining the resulting set of transducer outputs having differing points of view in the specified repository into a mosaic.

13. The system of claim 12, further comprising a plurality of UE, one of which is in controller mode and the remainder of which are in listener mode.

14. The system of claim 12, further comprising:
- means for establishing a group of participating listeners using a plurality of UE each having a camera, one of which is in controller mode and the remainder of which are in listener mode;
- means for providing audio and visual cues to alert each user of the UEs to prepare to activate their respective one or more transducers; and
- means for taking, after a predetermined time period by each group member UE, a near contemporaneous one or more transducer output(s).

15. The system of claim 12, wherein the UE in controller mode is adapted to provide the user feedback on the size of the listener group.

16. The system of claim 12, wherein the application further includes a proxy mode.

17. The system of claim 16, further comprising a means of expanding the listening group by signaling at least one of the UEs of the existing group members to enter the proxy mode.

18. The system of claim 17, further comprising a means for relaying commands to and from the UE in controller mode to one set of UEs in listener mode through a second set of UEs in proxy mode.

* * * * *

UNITED STATES PATENT AND TRADEMARK OFFICE
CERTIFICATE OF CORRECTION

| | | |
|---|---|---|
| PATENT NO. | : 7,835,727 B2 | Page 1 of 1 |
| APPLICATION NO. | : 11/625643 | |
| DATED | : November 16, 2010 | |
| INVENTOR(S) | : Nadas | |

It is certified that error appears in the above-identified patent and that said Letters Patent is hereby corrected as shown below:

On the Cover Page, item (56), under "FOREIGN PATENT DOCUMENTS", in Column 2, Line 3, delete "JP EP 1478134 A1 11/2004".

In Column 4, Line 53, after "identify" delete "the".

In Column 8, Line 32, in Claim 12, after "of" delete "at the".

Signed and Sealed this
First Day of February, 2011

David J. Kappos
*Director of the United States Patent and Trademark Office*